United States Patent [19]

Hussey et al.

[11] Patent Number: 5,368,428
[45] Date of Patent: Nov. 29, 1994

[54] APPARATUS AND METHOD FOR PRODUCING A VIDEO DISPLAY

[75] Inventors: John P. Hussey, Setauket; Richard M. Green, Bronx; Saul L. Keslowitz, Bayside, all of N.Y.

[73] Assignee: Grumman Aerospace Corporation, Bethpage, N.Y.

[21] Appl. No.: 642

[22] Filed: Jan. 5, 1993

Related U.S. Application Data

[62] Division of Ser. No. 428,234, Oct. 27, 1989, Pat. No. 5,181,823.

[51] Int. Cl.$^5$ ................................. B25J 3/00
[52] U.S. Cl. ........................... 414/1; 901/47; 901/34; 244/161; 395/94; 414/786; 348/125
[58] Field of Search ............... 414/729, 1, 730, 4, 414/5; 244/135 A, 161, 163; 901/34, 45, 47, 33; 395/94, 95; 348/116, 125, 128, 137, 141, 142

[56] References Cited

U.S. PATENT DOCUMENTS

| | | | |
|---|---|---|---|
| 3,976,382 | 8/1976 | Westby | 901/47 X |
| 4,651,283 | 3/1987 | Sciaky et al. | 395/94 X |
| 4,942,539 | 7/1990 | McGee et al. | 395/94 X |
| 5,181,823 | 1/1993 | Hussey et al. | 414/730 |

OTHER PUBLICATIONS

IBM Technical Disclosure Bulletin, vol. 16, No. 6, Nov. 1973, Pneumatic Touch Sensor, Garrison et al.

*Primary Examiner*—Donald W. Underwood
*Attorney, Agent, or Firm*—Scully, Scott, Murphy & Presser

[57] ABSTRACT

A method and apparatus for producing a video display that is especially useful in an article handling system to help control a mechanical arm to move an article into a selected position. A video camera is operated to produce a picture of the article on a video screen. At the same time, force sensor are used to measure forces on the article, and a graphical display of those sensed forces is produced on the view of the article on the video screen.

7 Claims, 3 Drawing Sheets

APPARATUS AND METHOD FOR PRODUCING A VIDEO DISPLAY

This is a divisional of copending application Ser. No. 428,234, filed on Oct. 27, 1989, now U.S. Pat. No. 5,181,823.

BACKGROUND OF THE INVENTION

This invention generally relates to a method and apparatus for producing a video display; and more particularly, to a method and apparatus for producing a video display that is especially useful to help control a mechanical arm, or similar device, to move an object into a selected position.

Video cameras are often used to monitor or observe objects or areas. For example, a mechanical arm may be used to move articles, and that arm may be controlled by an operator who may not be able to observe personally the operation of the arm. In such a case, movement of the article, the operation of the mechanical arm, or both, may be monitored by means of a video camera; and in particular, the camera may be used to produce a picture of the article, the mechanical arm, or both, on a video screen that may be watched by the operator.

Monitoring the movement of an article or the operation of a mechanical arm in this way is often very useful. Nevertheless, the picture on the video screen is of limited utility because the amount of information that it conveys is limited. For example, if the mechanical arm is used to carry an article to, and then place the article in, a specific location, various forces may be applied to the article as it is moved and then placed in this location; and it is often very difficult, or even impossible, for an operator to determine the magnitude of these forces from any view of the article or the mechanical arm on the video screen. As will be appreciated, a knowledge of the magnitude of these forces is very helpful because the forces may cause the object to move or, if the forces become large enough, may damage the article.

SUMMARY OF THE INVENTION

An object of the present invention is to produce a video display that is particularly useful to help control a mechanical arm, or similar device, to move an article into a selected position.

Another object of this invention is to produce a real time video and graphical display on a video screen that will enable an operator to move an article into a selected position without having to take his or her eyes off the video screen.

Another object of this invention is to move an article into a selected position by guiding a video camera that is attached to that article, toward a target.

A further object of the present invention is to use a video camera to produce a picture of a target on a video screen, to move an article, which is secured to the camera, into a selected position by moving the video camera toward the target, and to display graphically on the video screen, forces on that article as it is moved into that selected position.

These and other objectives are attained with an article handling system comprising a target, a mechanical arm, and a video system; and the video system, in turn, includes a video display means, a video camera and a display controller. In the operation of the article handling system, the target is positioned a given distance from and a given orientation relative to a selected position; and the video camera is connected to an article for movement therewith, with the video camera located the same given distance from and the same orientation relative to the article. The video camera is operated to produce a picture of the target on the display means; and at the same time, the display controller is actuated to produce an outline, which is preferably an outline of the target, in a selected location on the display means.

The mechanical arm is used to grip the article and to carry the article toward and into the selected position. As the article is so moved, the mechanical arm is controlled or manipulated to keep the video camera positioned so that the picture of the target on the display means is kept generally centered within the graphical outline of the target on the display means. In this way, the article is maintained generally aligned with the selected position, helping to move the article thereinto.

Preferably, force sensing means is provided to measure forces applied to the article as it moves into the selected position and to generate a signal indicating the magnitude of these forces. This signal is conducted to the display controller, which preferably also includes means to generate on the display means a graphical representation of the magnitude of these forces.

For example, the graphical display may include a two-dimensional view of three mutually orthogonal axes. The display controller may be adapted to display first, second and third variable length bars over the first, the second and the third axes, respectively, of the graphical display to represent three mutually orthogonal components of the force applied to the article as it moves into the selected position.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
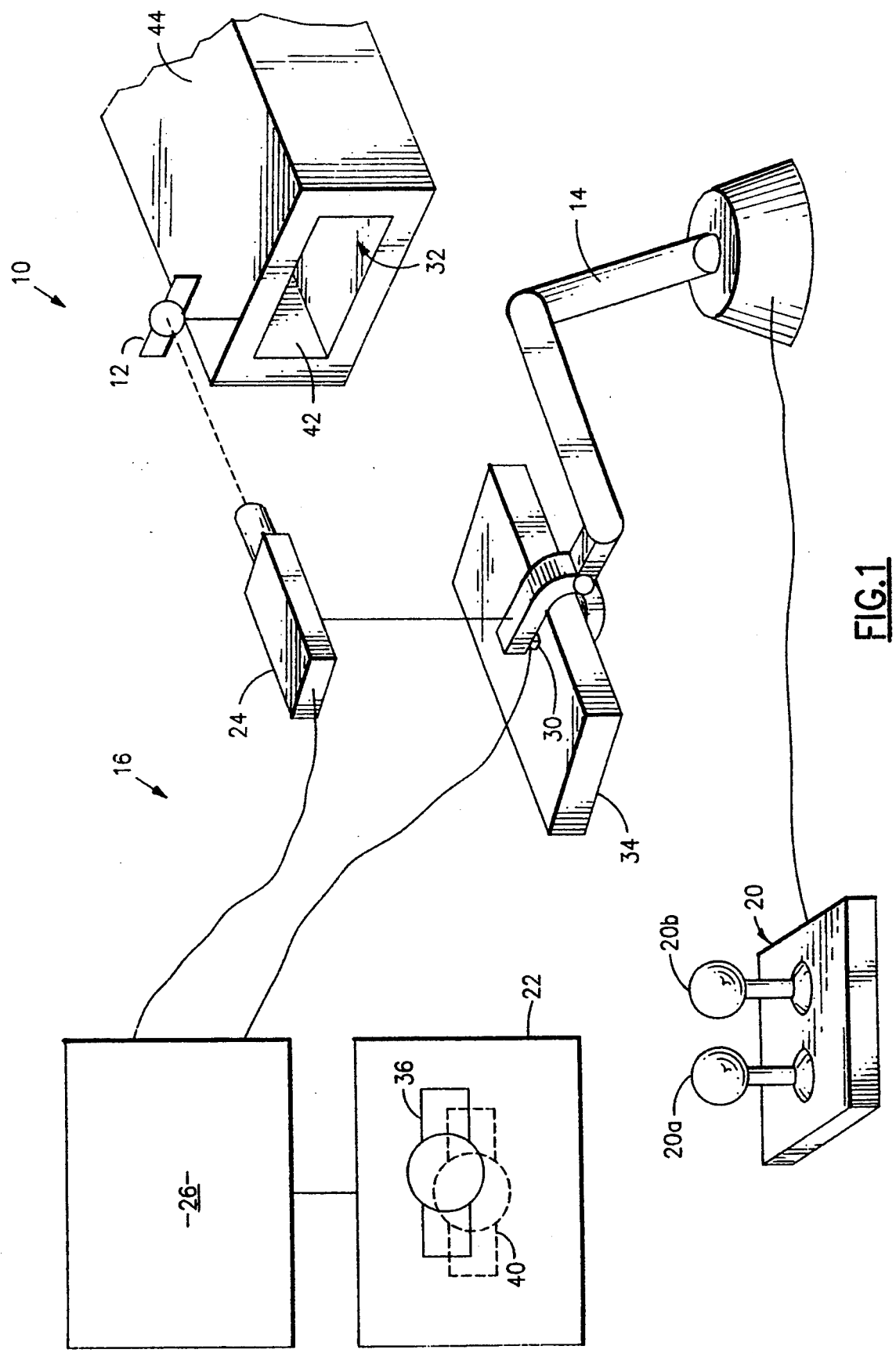
FIG. 1 generally illustrates an article handling system embodying the present invention.

With reference to FIG. 1, article handling system 10 generally comprises target 12, mechanical arm 14, video system 16 and control means 20; and the video system 16, in turn, includes video display means 22, video camera 24 and display controller 26. The system 10 illustrated in FIG. 1 further includes sensing means 30, which preferably are force sensors mounted on mechanical arm 14. In the operation of system 10, target 12 is positioned a given distance from and a predetermined orientation relative to a selected position, referenced in FIG. 1 at 32; and video camera 24 is connected to article 34, for example via the mechanical arm, for movement therewith, and with the video camera held the same given distance from and in the same predetermined orientation relative to the article. The video camera is operated to produce a picture 36 of the target on display means 22; and at the same time, display controller 26 is actuated to produce an outline 40, which is preferably an outline of the target in a selected, preferably fixed location on the display means.

Control means 20 is connected to the mechanical arm 14 to operate that arm to grip article 34 and to carry the article toward and into the selected position 32. As the article is moved toward that position, the mechanical arm is manipulated, via control means 20, to keep video camera 24 positioned so that the picture 36 of the target on the display means is kept generally centered within, or relative to, the graphical outline 40 of the target on the display means. In this way, article 34 is maintained generally aligned with position 32, helping to move the article into that specific position.

As illustrated in FIG. 1, the selected position into which article is moved, is an interior space defined or formed by surfaces 42 of member 44; and as article 34 is moved into that space, the article may hit or strike against the outside of member 44, or the article may scrape or bind against surface 42. Force sensing means 30 is provided to measure the forces applied to article 34 by member 44 as the article moves into space 32, and to generate a signal indicating the magnitude of these forces. This signal is conducted to display controller 26, which preferably also includes means to generate on display means a graphical representation of the magnitudes of these forces. An example of such a graphical representation is referenced at 46 in FIG. 2. With this graphical display, an operator has knowledge of, not only the position of article 34 relative to the selected position, but also the magnitude of the forces on the article as it is moved into that selected position. With the dual illustration of target 12 and graphical display 46, an operator can readily move article 34 into the selected position without removing his or her eyes from video screen 22.

As previously mentioned, with the embodiment of system 10 illustrated in FIG. 1, force sensing means 30 is mounted on mechanical arm 14, and thus this sensing means directly measures the forces between that arm and article 34. As will be understood, the forces applied to article 34 by surface 42 can be calculated from these measured forces and a knowledge of the other forces acting on article 34, such as the force of gravity. The forces between article 34 and surface 42 may be measured in other ways, though; and for instance, force sensors may be located directly on article 34 or on surface 42.

Any suitable graphical display 46 may be used in the practice of the present invention; although preferably, the display is of the type that comprises a frame and one or more variable images to represent the forces applied to article. Moreover, often it is very helpful to understand not only the total force being applied to the article 34 by surface 42 at any given time, but also the components of that force in three mutually orthogonal directions, referred to herein as the x, y and z directions respectively. Because of this, preferably, the graphical display 46 produced on display means 22 illustrates the magnitude of each of these components of the force between surface 42 and article 34.

Figure 2:
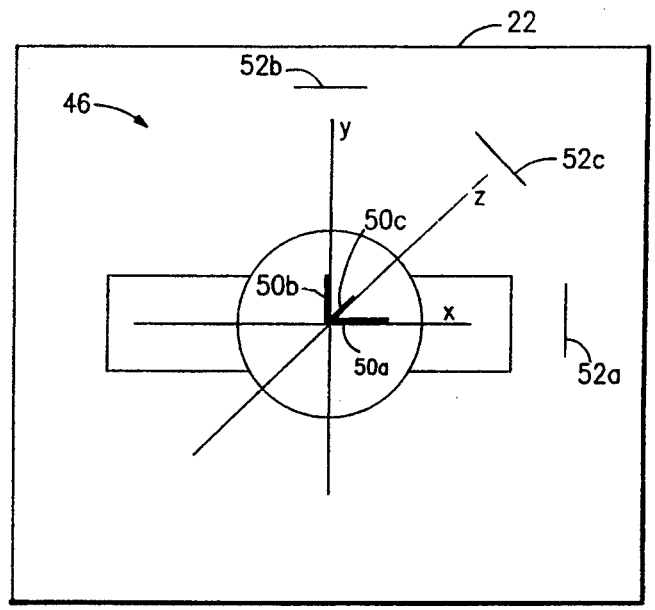
FIG. 2 shows a graphical display that may be shown on the video screen of the system of FIG. 1.

For example, as shown in FIG. 2, the frame of the graphical display may be a two-dimensional view of three mutually orthogonal axes, referred to as the x,y and z axes respectively. Further, with the preferred system 10, display controller 26 is adapted to display a first, variable length bar 50a along or over the x axis of the graphical frame to represent the x component of the force applied to the article 34, to display a second, variable length bar 50b along or over the y axis of the graphical frame to represent the y component of the force applied to the article, and to display a third, variable length bar 50c along or over the z axis of the graphical frame to represent the z component of the force applied to the article.

In addition, preferably display controller 26 is further adapted to display graphically the torque, or moment, applied to article 34 by surface 42 and tending to pivot or twist the article about the area at which the article is gripped by arm 14. For instance, also as illustrated in FIG. 2, a first variable length bar 52a may be located at the end of the x-axis to represent the torque on article 34 from the x component of the force applied to the article, a second variable length bar 52b may be located at the end of the y-axis to represent the torque on the article from the y component of the force applied to the article, and a third variable length bar 52c may be located at the end of the z-axis to represent the torque on the article from the z component of the force applied thereto. These torques can be calculated in a standard manner from a knowledge of the location of the article at which it is being gripped by the mechanical arm and from a knowledge of the forces applied to the article, which in turn can be determined in a known manner from the forces sensed by sensing means 30.

Preferably, as article 34 is moved toward selected position 32, graphical display 46 is not shown on display means 22 until the article is about to touch, or first touches, surface 34, or until the article reaches a predetermined position closely adjacent the selected position. The time at which the graphical display 46 is first shown on display means 22 may be automatically controlled by one or more sensors that may sense when the article first touches surface 42 or reaches a specific position. Alternatively, the time at which the graphical display 46 is first shown on display means 22, may be controlled by an operator, who, for example, may actuate a switch (not shown) to produce that graphical display.

Any suitable target 12, mechanical arm 14 and control means 20 may be employed in system 10. Preferably, target 12 has a relatively simple, well-defined shape, and the manner in which the picture 36 of the target appears on display means 22 changes noticeably if video camera 24 is rotated or pivoted slightly relative to the target. Preferably, mechanical arm 14 is capable of moving article 34 along three mutually orthogonal axes and of pivoting the article about each of those axes, providing what is referred to as six degrees of freedom of motion. Further, preferably, the mechanical arm includes the motor or power means needed to move and to manipulate the arm in the desired manner. As illustrated in FIG. 1, control means 20 includes two joysticks: a first joystick 20a that is used to actuate the mechanical arm to move article in the x, y and z directions; and a second joystick 20b that may be used to control the mechanical arm to pivot the article about each of those three axes.

Any suitable arrangements may be used to hold target 12 at the given distance and orientation from position 32, and to hold camera 24 at that same given distance and orientation from article 34. As shown in FIG. 1, target 12 is rigidly connected to member 44 by a connecting rod or bar; and video camera 24 is rigidly secured to mechanical arm 14, specifically a hand section thereof, also by a connecting rod or bar. Alternatively, for example, video camera 24 may be directly connected to article 34, either releasably or permanently.

System 10 of the present invention may be used in many specific applications. For example, it is contemplated that the system may be used in outer space, with mechanical arm 14 used to move or handle articles outside a space craft while being controlled, via display means 22 and control means 20, by an operator inside the space craft. As another example, system 10 may be used in a factory or in a power plant, with the mechanical arm operated by a person located inside a control station or area that is some distance from the mechanical arm itself.

Figure 3:
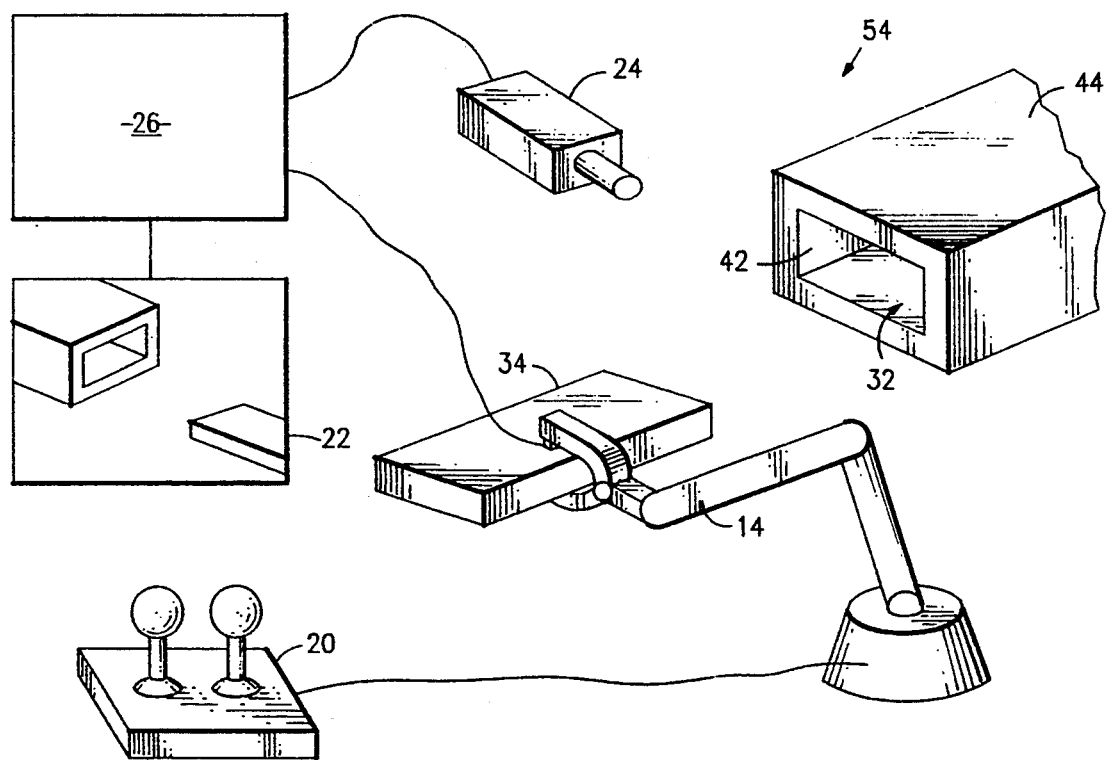
FIG. 3 generally illustrates an alternate article handling system also embodying the present invention.

FIG. 3 illustrates an alternate article handling system 54 comprising mechanical arm 14, control means 16, video display means 22, video camera 24, display controller 26 and sensing means 30. Arm 14, control means 16, display means 22, display controller 26 and sensing means 30 of system 54 generally operate in the same manner in which they operate in system 10, and hence it is not necessary to describe herein in detail the operation of these elements of system 54. The principal differences between systems 10 and 54 is that the latter system does not require target 12, and in system 54, video camera 24 is not in a fixed position relative to article 34. Instead, with this alternate system of FIG. 3, the video camera is located adjacent article 34 and selected position 32, and the video camera is used to produce on display means 32, a picture, preferably in real time, of article 34 and position 32. Any suitable means may be used to support and to hold the video camera in this position. For instance, a separate support means (not shown) may be used to hold the video camer, or the camera may be supported by mechanical arm 14.

Figure 4:
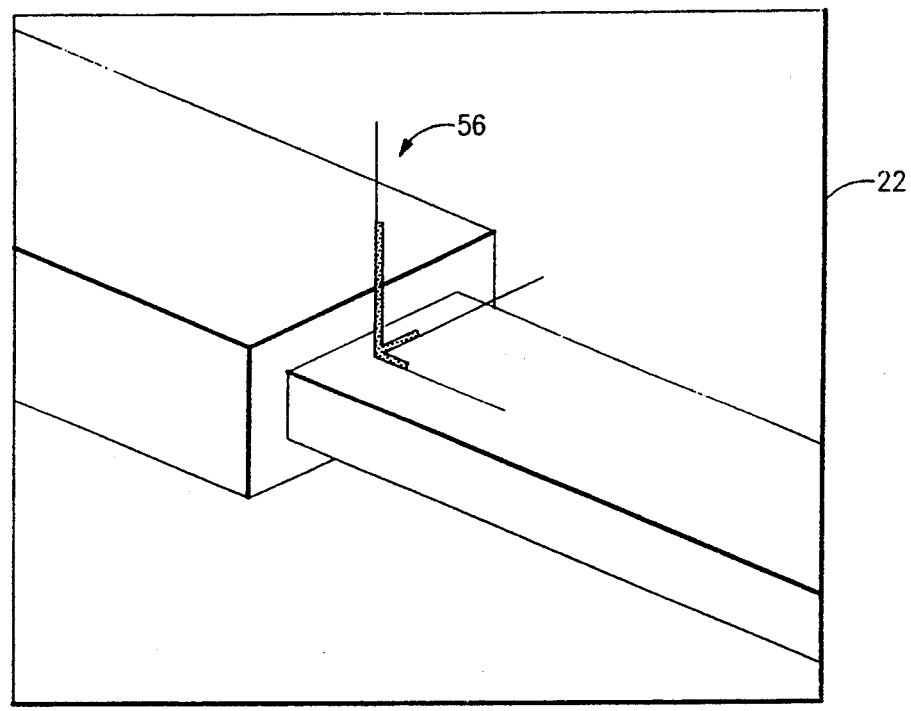
FIG. 4 shows a graphical display that may be shown on the video screen of the system of FIG. 3.

As mechanical arm 14 carries article 34 into position 32, sensing means 20 generates a signal indicating selected forces on the article, preferably the forces between article 34 and member 44, and this signal is transmitted to display controller 26, which produces a graphical display on display means 22 to illustrate these forces. Any suitable graphical display may be used to illustrate these forces, although preferably the display illustrates these forces in real time, and the display includes at least three variable images, respectively representing the x, y and z components of the force between article 34 and member 44. For example, as shown in FIG. 4, the graphical display 56 may include a two dimensional view of three mutually orthogonal axes, with a variable length bar shown on or along each of these axes to represent the x, y and z components of the force between article 34 and member 44. Moreover, preferably this graphical display is shown directly over the live video picture of article 34. With this real time video and graphical display, an operator can readily move article 34 into position 32 without having to take his or her eyes off of video screen 22.

Figure 5:
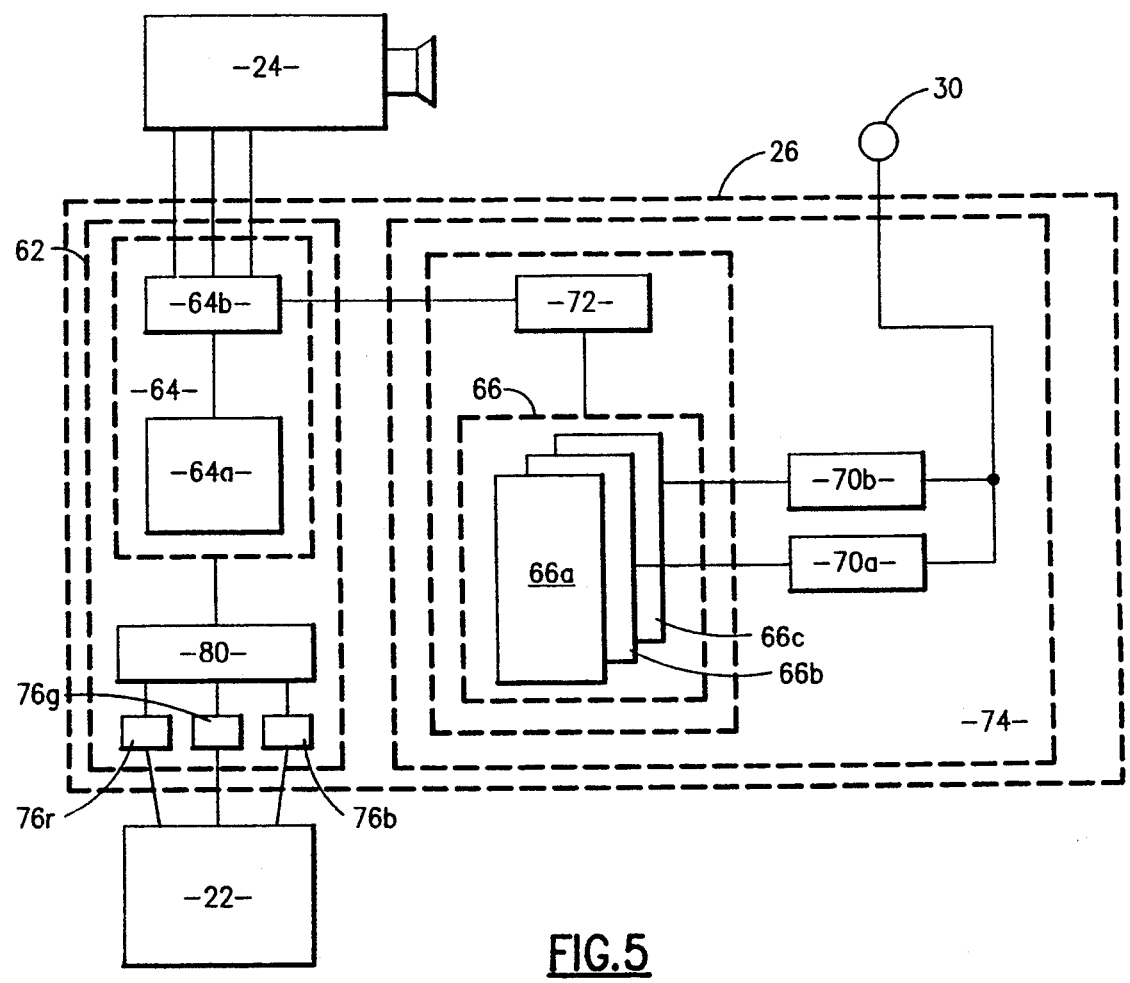
FIG. 5 is a block diagram of the video system employed in the article handing system of FIG. 1.

FIG. 5 illustrates the components of video system 16 in greater detail; and generally, this video system comprises display means 22, display control means 62 including graphics card 64, video camera 24, and memory area 60 which preferably includes a plurality of data pages 66a–c. System 16 further includes sensing means 52, graphics data generating means 70, which preferably includes a plurality of graphics modules 70a–c, and control means 72. Memory area 66, graphics modules 70a and b and control means 72 may all be part of a single processor or processing unit 74.

Display means 22 is such that a video image, or picture, may be shown on the display means by modulating or generating light at selected ones of a multitude of display positions, referred to as display pixels, which in the preferred embodiment, are positions along a cathode ray tube raster. As will be understood, other types of display devices may be used in the practice of the present invention. Preferably, the display means is a high resolution color monitor.

Display control means 62 is provided to generate a signal and to transmit that signal to display means 22 to produce the desired picture thereon. Any suitable display control means may be used in system 16; and for instance, the necessary information may be stored in memory area 64a of graphics card 64, and coded information read from that memory area may be directed to color channels 72R, G and B by control equipment 80. In a conventional manner, the color channels 76R, G and B transmit signals to display means 22 to produce the desired video pattern on the display means, and each color channel contains a register so that the information in the channel can be synchronized with operation of the display means. The coded data on graphics card 64 can be changed so that, at different times, different images or pictures can be shown on the display means.

More specifically, a multitude of memory locations are located in card memory area 64a, and each of these memory locations is associated with a respective one of the display pixels on display means 22. In operation, data values are stored in all of the memory positions in memory area 64a, these data values are read from the card memory area in synchronization with the movement of a cathode ray raster across the display means, and the data value in each card memory location is used to control the raster as it moves over the display pixel associated with the memory location. For example, each data value in the graphics card may comprise three, five bit binary numbers used, respectively, to determine the intensity of the colors blue, red and green at the associated pixel on the display means.

Video camera 24 is provided to generate a multitude of picture signals, each of which represents one complete picture or image of a scene. More specifically, in the video camera, an image of a scene is separated into a large number of small areas, referred to as image pixels, and data values are generated to indicate the color and intensity of light at these image pixels. Each picture signal generated by the video camera includes one such data value for each image pixel.

Each display pixel corresponds to an image pixel, and a picture of a scene can be duplicated on the display means 22 by illuminating each display pixel according to the data value generated from the corresponding image pixel. Preferably, each data value in each picture signal is comprised of three components that are used, respectively, to determine the intensity of the colors blue, red and green at the corresponding display pixel. Any suitable video camera may be employed in the practice of the present invention. Numerous such cameras are well known in the art, and it is unnecessary to describe video camera 24 in further detail herein.

Each memory location in memory area 64a of the graphics card is associated with an image pixel. In the operation of video system 16, the data values produced by video camera 24 from the image pixels are not transmitted directly to monitor 22, but instead are transmitted to graphics card 64 and converted to digital values by analog-to-digital converter 64b. These digital values may then be transmitted to data storage area 64a, and each converted digital value may be stored therein at the location or address associated with the image pixel from which the data value was generated.

Memory pages 66a–c, graphics modules 70a and b and control means 72 are provided to generate the desired graphical displays on display means 22; and, in particular, memory page 66a is used to generate display 40, while memory pages 66b and c, sensing means 30 and graphics modules 70a and b are used to generate displays illustrating the changing values of the parameter or parameters sensed by sensing means 30. Each data page 66a–c includes a multitude of data locations, each of which is associated with a respective one memory location in memory area 64a of the graphics card, and hence with a respective one display pixel. Generally, when a data value stored in a particular memory location in a data page 66a–c is transmitted to the associated memory location in the graphics card, that data value will then control the manner in which the associated display pixel is illuminated.

Data values are located in data page 66a such that when these values are transmitted to the associated locations in graphics card 64a, those values will then produce display 40 on display screen 22. These data values may be transmitted to data page 66a in any suitable manner. For example, these values may be permanently stored in the memory page, or the values may be transmitted thereto by an operator or a program in processor 74.

Graphics module 70a and b are provided to receive data values from sensing means 30, to generate display or image data from those data values and to transmit the generated display data to, and to store that data in, selective locations in memory pages 66b and c.

Each graphics modules 70a and b is used to generate a respective one type of graphical display. For instance, module 70a may be used to generate the display 46 illustrated in FIG. 2, and module 70b may be used to generate a display comprised of a multitude of points on a conventional x-y grid. Generally, each graphics module 70a and b includes a software program provided with the necessary data and instructions to produce the desired data values and to identify the proper storage locations in the associated memory page for those data values.

Each graphical display generated by modules 70a and b is comprised of two parts: a first component that is a frame or framework for the display; and a second component that includes image variables, built on or around that frame, and that represent the measured values for the parameter of interest. For example, with the display shown in FIG. 2, the frame is comprised of three lines representing the x-, y- and z-axes; and the image variables are the bars shown over these lines to indicate changes in the value of the measured or sensed parameter. For a display that shows a point on a conventional x-y coordinate system, the frame is two orthogonal lines representing, respectively, the x- and y-axes, and the image variable is the point, with the position of the point being changed to indicate changes in the value of the measured parameter.

Each graphics module 70a and b may be provided with one sub program or function that is used to determine, first, the addresses in the associated memory page that, in turn, are associated with the display pixels needed to show the framework for the desired graphical display, and second, the data values that must be stored at those addresses to illuminate those display pixels in the desired manner or color. Each graphics module may be provided with another sub program or function that identifies, in terms of the measured parameter of interest, first, the addresses in the associated memory page that are associated with the display pixels needed to show the image variable or variables of the graphical display, and second, data values for those addresses.

When a graphics module 70a or b is selected or invoked to generate a graphics data set for the associated memory page, the module determines the addresses in the associated memory page that are themselves associated with the display pixels needed to display the framework of the graphics display, and the appropriate values for those addresses; and the module then transmits these values to their respective addresses in the memory page. Then, as values for the sensed parameter or parameters are transmitted to the graphics module from sensing means 30, the graphics module determines the data storage addresses in the associated memory page that correspond to the display pixels needed to display the variable image or images of the graphical display, and the appropriate values for those addresses; and the graphics module then transmits those values to their proper respective addresses in the associated memory page.

Control means 72 is provided, generally, to control the transmission of data from video camera 24 and from memory area 66 to graphics card 64 to store the proper data values at the proper locations in the graphics card to produce the desired display on display means 22; and in particular, to transmit to each memory location in memory 64a of the graphics card, an associated data value either from a picture signal from the video camera or from one of the data pages 66a–c. Any suitable procedure may be used to select the data values for these memory locations in the graphics card from either the picture signal from the video camera or one of the memory pages 66a–c. With the preferred embodiment of the present invention, generally, the data values for all of the display pixels are transmitted to the graphics card from the video camera, except for the display pixels needed to show the desired graphical display, and the data values for all of these display pixels are transmitted to the graphics card from one of the pages 66a–c in memory section 66.

For example, with one preferred technique, each data storage location in each memory page is provided with a bit, referred to as a data overlay bit, having first and second states or positions which indicate, respectively, that the data value for the associated memory location in the graphics card is to be taken from the memory page itself or from the picture signal from the video camera. Control means 72 repeatedly scans through all of the memory locations of a selected one of the data pages 66a, b or c; and each time the control means scans over each memory location of that data page, the control means checks the state or condition of the data overlay bit. If the data overlay bit of a particular data page memory location is in the first state, the control means 72 transmits the data value in that memory location to the associated memory location in the graphics card; however, if the data overlay bit of a particular data page memory location is in the second state, control means 72 transmits to the associated memory location in the graphics card, the associated data value in the picture signal generated by the video camera.

Video camera 24 continuously generates the picture signals; and for example, a complete picture signal may be generated and transmitted to the graphics card once every 1/30 of a second. Similarly, sensing means 30 continuously senses the parameter or parameters of interest and transmits to the graphics data generating means 70, data values representing the measured parameter. For instance, the sensing means may transmit such a signal to the graphics generating means once every 25 milliseconds. Moreover, preferably the data values in graphics cards 64 are completely replaced, or written over, once every 30 milliseconds. With this procedure, the graphical display generated on the display means 22 provides a substantially immediate, or real time, indication of the measured value of the parameter of interest.

As described above, video system 16 is employed in system 10 to help move an article into a selected position. Video system 16 may be used in other applications, however. For instance, system 16 may be used to generate a real time video picture of an object, and to impose over that picture a graphical display illustrating a parameter of interest of that object. To do this, video camera 24 is used to produce a picture of that object on video screen 22, while sensing means 30 is simultaneously used to sense one or more parameters of interest of that object. The sensed parameter or parameters that are graphically displayed using video system 16 may be any variable parameter generated by, within, on or from an article of interest, and that is sensed or measured directly or indirectly from that article. As will be understood, many different parameters may be sensed or measured and graphically displayed in accordance with the present invention. For instance, the sensed parameter may be the force being applied to an object or to a portion thereof. If the article of interest is an electric motor, the sensed parameter, may be, for example, the motor speed or the electric current conducted through the motor.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A display apparatus comprising:
   means to produce a view of an article on a display screen for a period of time;
   means to measure, at least at a multitude of times during said period, forces applied to the article during said period; and
   graphical display means to impose on said view and during said period, a graphical display illustrating the measured forces, and including means to represent in the graphical display each of the measured forces at a respective time during said period.

2. Display apparatus according to claim 1, wherein the graphical display means includes:
   means to produce a graphical frame on the display screen and to maintain the graphical frame in a fixed position thereon relative to the view of the article; and
   means to produce a multitude of graphical images on the display screen, each of the graphical images representing a respective one of the measured forces and being shown on the screen substantially at the same time said respective one force is measured.

3. Display apparatus according to claim 2, wherein:
   the measured forces each include first, second, and third mutually orthogonal components;
   the graphical frame includes a two-dimensional view of three mutually orthogonal axes; and
   the means to produce the graphical images is adapted to produce
   i) a first, variable length bar along a first of said axes to represent the magnitude of the first component of the forces applied to the article,
   ii) a second, variable length bar along a second of said axes to represent the magnitude of the second component of the forces applied to the article, and
   iii) a third, variable length bar along a third of said axes to represent the magnitude of the third component of the forces applied to the article.

4. A method of moving an article into a selected position, comprising:
   operating a video camera to produce a picture on a video screen showing both the article and the selected position;
   moving the article toward and into the selected position;
   sensing a force applied to the article; and
   graphically displaying on the video screen the sensed force as the article is moved into the selected position.

5. A method according to claim 4, wherein the selected position is adjacent a surface, and said force is a force between the article and the surface.

6. Apparatus for moving an article into a selected position, comprising:
   a moveable mechanical arm;
   arm control means connected to the mechanical arm to operate the arm to grip the article and to carry the article into the selected position;
   video display means;
   a video camera located adjacent the article and connected to the video display means to produce a picture thereon showing both the article and the selected position;
   sensing means to sense a force on the article and to generate a signal indicating the magnitude of the sensed force; and
   graphical display means connected to the sensing means to receive said signal therefrom, and connected to the video display means to generate thereon a graphical display of the sensed force.

7. Apparatus according to claim 6, wherein:
   said force includes first, second, and third mutually orthogonal components; and
   the graphical display means includes means to generate on the video display means a graphical display illustrating the magnitude of each of said first, second, and third components.

* * * * *